United States Patent [19]

Maruyama

[11] Patent Number: 5,140,484
[45] Date of Patent: Aug. 18, 1992

[54] MAGNETORESISTIVE HEAD HAVING ELECTRODES WITH A PREDETERMINED LENGTH AND POSITIONED TO FORM A PREDETERMINED ANGLE WITH THE HEAD SURFACE

[75] Inventor: Takao Maruyama, Tokyo, Japan

[73] Assignee: NEC Corporation, Tokyo, Japan

[21] Appl. No.: 675,192

[22] Filed: Mar. 26, 1991

[30] Foreign Application Priority Data

Mar. 27, 1990 [JP] Japan .................................. 2-77277

[51] Int. Cl.⁵ .............................................. G11B 5/127
[52] U.S. Cl. ..................................... 360/113; 360/126
[58] Field of Search ................................. 360/113, 126

[56] References Cited

U.S. PATENT DOCUMENTS 4,843,506 6/1989 Gill ....................................... 360/113

Primary Examiner—A. J. Heinz
Attorney, Agent, or Firm—Sughrue, Mion, Zinn, Macpeak & Seas

[57] ABSTRACT

A magnetoresistive playback head for a small magnetic disk. Electrodes connected to an MR element each has a linear portion extending over a length which is more than ten times greater than the width of the MR element. The electrodes each extends from the MR element at an angle less than 14 degrees. This allows only a single magnetic domain to exist in the MR element and frees the magneto-resistive response from distortions or hysteresis. As a result, signals reproduced from a magnetic recording medium do not include any distortion or noise.

2 Claims, 3 Drawing Sheets

MAGNETORESISTIVE HEAD HAVING ELECTRODES WITH A PREDETERMINED LENGTH AND POSITIONED TO FORM A PREDETERMINED ANGLE WITH THE HEAD SURFACE

BACKGROUND OF THE INVENTION

The present invention relates to a magnetoresistive (MR) head and, more particularly, to an MR head desirably operable as a playback head for reading a magnetic disk.

An MR head is formed of NiFe, NiCo or similar ferromagnetic material. This type of head is based on a so-called MR effect, i.e., the fact that the ferromagnetic material changes its resistance depending on an angle between the direction of a current which flows through the ferromagnetic material and the direction of magnetization in the material. The MR effect is characterized in that the magnitude of a signal output depends only on the intensity of magnetic field and does not depend on the transition ratio of magnetic field. Hence, the signal output does not fall even when the relative speed between the head and a magnetic medium is reduced. For this reason, a MR head is a promising playback head for small magnetic disks.

Ideally, an MR element included in the MR head should operate under a single magnetic domain condition. Should a plurality of magnetic domains exist in the MR element, the rotation of magnetization relative to the signal field would be irregular since the direction of magnetization would differ from one magnetic domain to another. On the other hand, when the magnetic wall shifts in response to a change in the intensity of signal field, so-called Barkhausen noise is produced. The distortions of signal output and Barkhausen noise aggravate the error rate of signals read out by the MR head and, therefore, have to be reduced or fully eliminated.

SUMMARY OF THE INVENTION

It is therefore an object of the present invention to provide a MR head capable of effectively reducing the distortions of signal output and Barkhausen noise.

It is another object of the present invention to provide a generally improved MR head.

In accordance with the present invention, an MR head comprising an MR element and electrodes formed integrally with the MR element, the electrodes each extends from the MR element at an angle smaller than 14 degrees to a surface of the head which faces a magnetic recording medium, and the electrodes each has a linear portion which extends from the MR element over a length which is more than ten times greater than the width of the MR element.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1A:
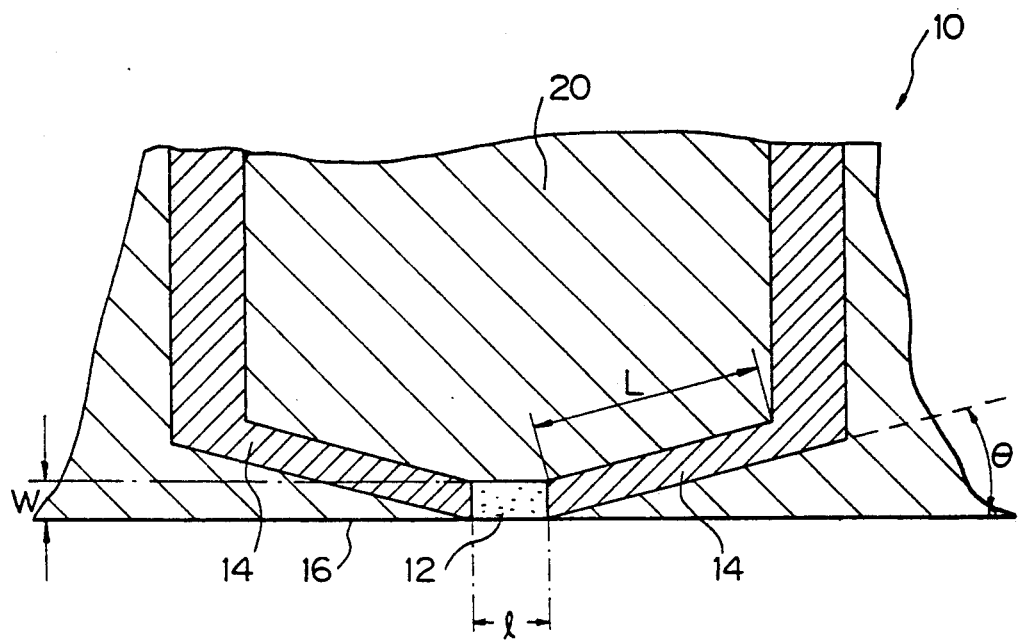
FIG. 1A is a plan view showing an MR head embodying the present invention.
Figure 1B:
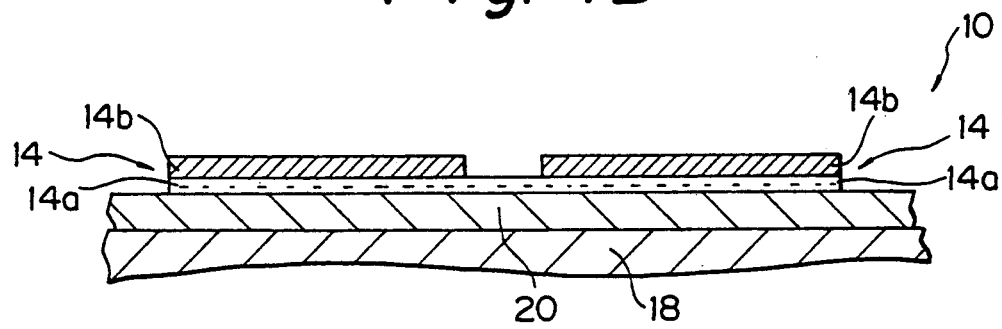
FIG. 1B is an elevation of the embodiment.

Referring to FIGS. 1A and 1B, an MR head embodying the present invention is shown and generally designated by the reference numeral 10. As shown, the MR head 10 has an MR element 12 and a pair of electrodes 14 connected to opposite sides of the MR element 12. In the illustrative embodiment, the MR element 12 has a length l and a width W which are 10 microns each. The electrodes 14 are made up of a common underlayer 14a and conductive layers 14b provided on the underlayer 14a and made of a good conductor material. The underlayer 14a is formed integrally with the MR element 12. The electrodes 14 each extends from the MR element 12 at an angle $\theta$ of 7 degrees to the surface of the head 10 which faces a magnetic recording medium, not shown. Further, each electrode 14 extends linearly over a length L of 100 microns from the MR element 12. The MR element 12 has a tri-layered bias structure, i.e., a MR film made of NiFe, an intermediate film made of Ti and deposited on the MR film, and a bias film made of CoZrMo and deposited on the intermediate film. The MR film is 400 angstrom thick while the intermediate film and the bias film are respectively 100 angstrom thick and 600 angstrom thick. The electrodes 14 have a quad-layered structure, i.e., a tri-layered structure similar to that of the MR element 12 and the conductive layer 14b provided on the tri-layered structure. The conductive layer 14b is implemented as an Au film, for example, and 2000 angstrom thick. A substrate 18 is formed of a ceramic and laminated on an insulating layer 20 which is constituted by an $Al_2O_3$ film.

Figure 2A:
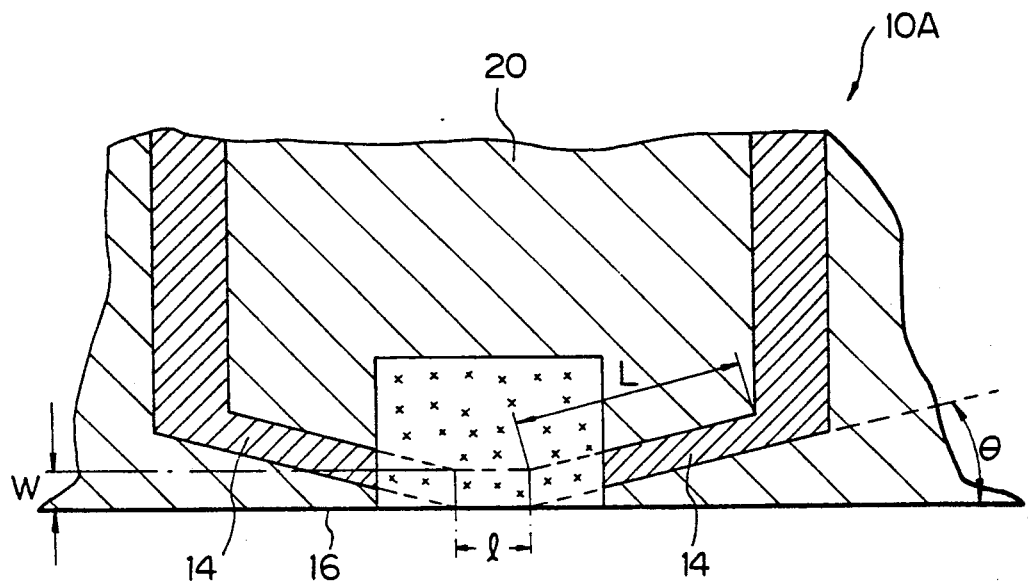
FIG. 2A is a plan view showing an alternative embodiment of the present invention.
Figure 2B:
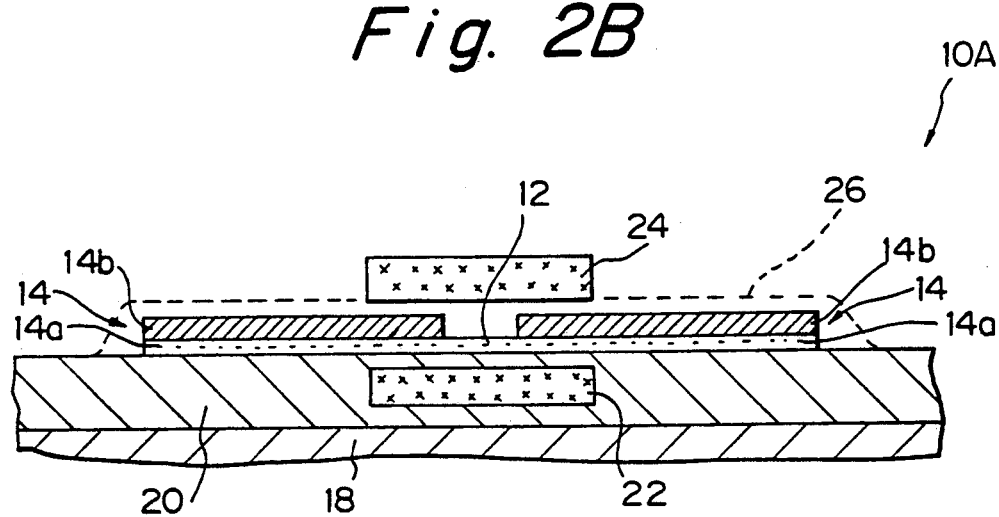
FIG. 2B is an elevation of the alternative embodiment.

Referring to FIGS. 2A and 2B, an alternative embodiment of the present invention is shown. As shown, an MR head, generally 10A, has magnetic shields 22 and 24 located at opposite sides of the MR element 12. The magnetic shields 22 and 24 are 1 micron thick each. The magnetic shield 22 is buried in the insulating layer 20 and does not appear on the surface where the underlayer 14a is provided. The other magnetic shield 24 is provided on an insulating layer 26 (indicated by a dashed line only in FIG. 2B) which is laminated on the MR element 12 and electrodes 14.

Figure 3:
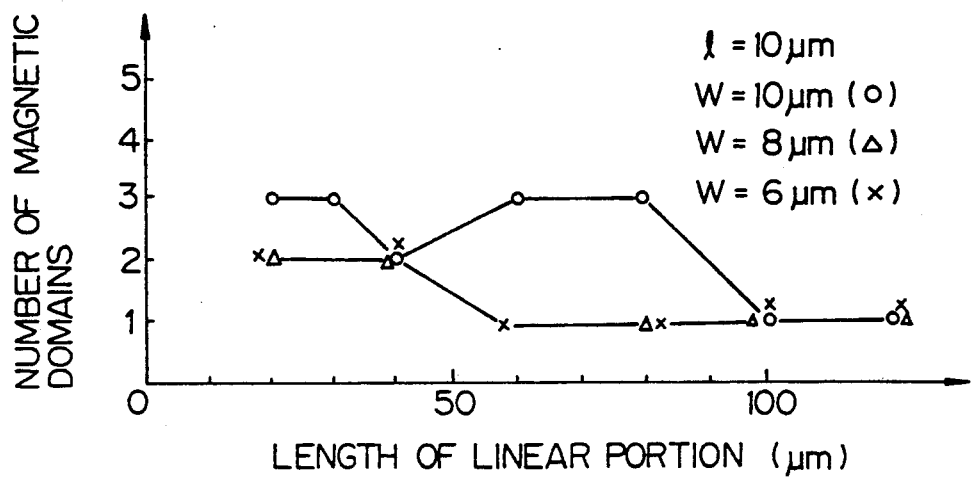
FIG. 3 is graph representative of a relation between the linear portion of an electrode included in an MR head and the number of magnetic domains.

The characteristics of any of the embodiments will be described with reference to FIGS. 3 and 4. FIG. 3 is a graph showing a relation between the length L of the linear portion of each electrode 14 and the number of magnetic domains existing in the MR element 12. As the graph indicates, assuming that the width W of the MR element 12 is 6 microns, then the number of magnetic domains of the MR element 12 is one when the length L of the linear portion is greater than about 60 microns. Assuming that the width W of the MR element 12 is 8 microns, the number of magnetic domains is one when the length L is greater than about 80 microns. Further, when the width W is 10 microns, the number of magnetic domains is one when the length L is greater than 100 microns. It will therefore be seen that a single magnetic domain exists in the MR element 12 when the length L of the linear portion of the electrode 14 is more than ten times greater than the width W of the MR element 12.

Figure 4:
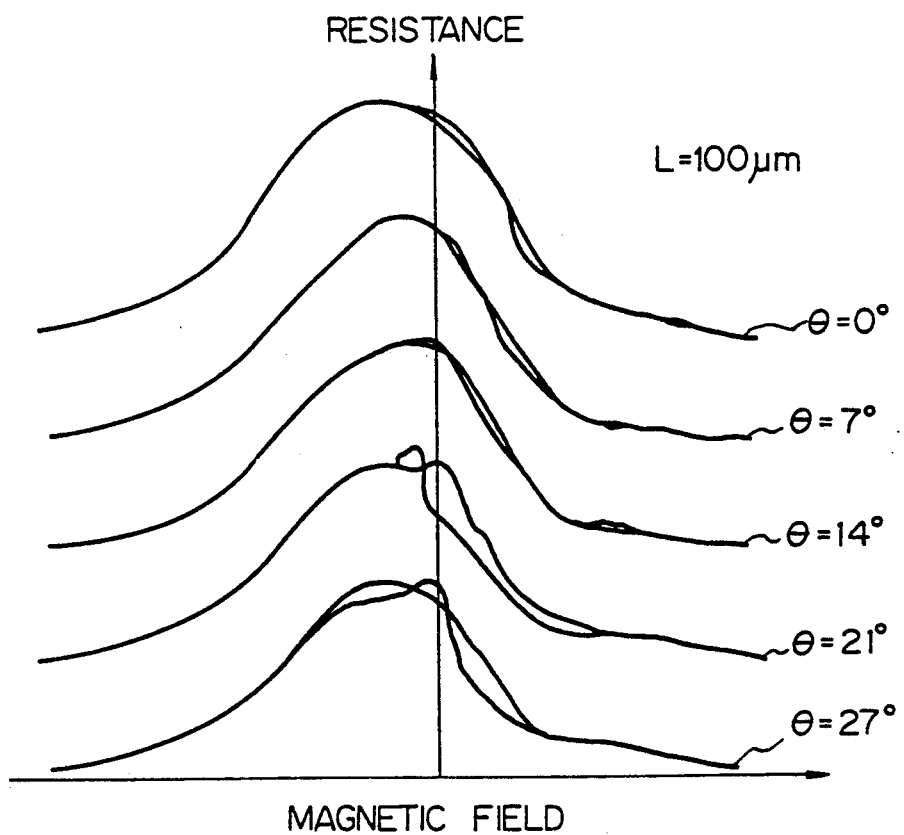
FIG. 4 plots field-resistance variations with respect to specific angles of an electrode of an MR head.

FIG. 4 shows curves representative of magneto-resistive response with respect to specific angles θ of the electrodes 14. As shown, when the angle θ is smaller than 14 degrees, hardly any distortion or hysteresis occurs in the magneto-resistive response. However, when the angle θ is greater than 21 degrees, distortion or hysteresis appears in the magneto-resistive response.

It should be noted that, when the angle θ=0°, the linear portion of the electrodes 14 is exposed from the surface of the base which faces the magnetic medium, so that the electrodes 14 are apt to contact the medium and shortened with each other. Therefore, the angle θ is preferably more than 0°.

In summary, in accordance with the present invention, electrodes connected to a MR element each has a linear portion extending over a length which is more than ten times greater than the width of the MR element. This, coupled with the fact that each electrode extends from the MR element at an angle less than 14 degrees, allows only a single magnetic domain to exist in the MR element and frees the magneto-resistive response from distortions or hysteresis. As a result, signals reproduced from a magnetic recording medium do not include any distortion or noise.

Various modifications will become possible for those skilled in the art after receiving the teachings of the present disclosure without departing from the scope thereof.

What is claimed is:

1. A magnetoresistive (MR) head having a surface that faces a magnetic recording medium, said head comprising:
   an MR element and electrodes formed integrally with said MR element, said electrodes each having a linear portion of predetermined length which is connected to and extends from said MR element, wherein one surface on each linear portion forms a predetermined angle with said head surface, said angle being greater than zero and less than 14 degrees, said MR element having a width in a direction perpendicular to said head surface, wherein said length of said linear portion is more than ten times greater than the width of said MR element.

2. A head as claimed in claim 1, wherein a pair of magnetic shields are located at opposite sides of said MR element and part of said linear portions of said electrodes, one of said magnetic shields underlying said MR element and said electrodes having a flat configuration.

* * * * *